United States Patent [19]

Bos

[11] 4,327,506
[45] May 4, 1982

[54] GEAR CASE FOR A SUCTION CUTTER DREDGER

[75] Inventor: Wouter A. Bos, Dordrecht, Netherlands

[73] Assignee: Reba B.V., Dordrecht, Netherlands

[21] Appl. No.: 162,770

[22] Filed: Jun. 25, 1980

[30] Foreign Application Priority Data

Jun. 25, 1979 [NL] Netherlands .......................... 7904944

[51] Int. Cl.³ .............................................. E02F 3/88
[52] U.S. Cl. .......................................... 37/65; 37/67; 172/253; 173/29
[58] Field of Search ...................... 37/64, 65, 67; 56/2; 172/245, 250, 253, 254, 125; 173/29

[56] References Cited

U.S. PATENT DOCUMENTS

| | | | |
|---|---|---|---|
| 545,762 | 9/1895 | Bates | 37/65 |
| 890,764 | 6/1908 | Geare | 37/65 X |
| 2,002,748 | 5/1935 | Nereling | 37/65 |
| 3,148,464 | 9/1964 | Jones | 37/67 |
| 3,253,357 | 5/1966 | Allard | 37/65 |
| 3,863,988 | 2/1975 | Bartels | 37/97 X |
| 4,111,264 | 9/1978 | Van der Lely | 172/125 X |

*Primary Examiner*—Clifford D. Crowder
*Attorney, Agent, or Firm*—Scully, Scott, Murphy & Presser

[57] ABSTRACT

A gear case for a rotary cutter head of a suction cutter dredger, comprising at least two connecting members each suitable for pivotally coupling the gear case to the ladder frame, said connecting members being located at the acute angles of an imaginary right-angled triangle, and the drive shaft extending approximately along, or approximately parallel to, one of the legs of said triangle.

8 Claims, 5 Drawing Figures

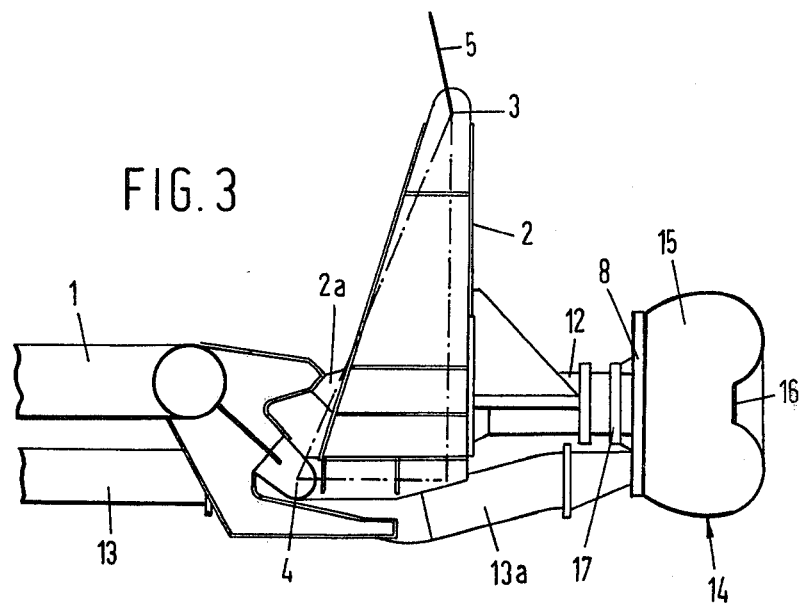
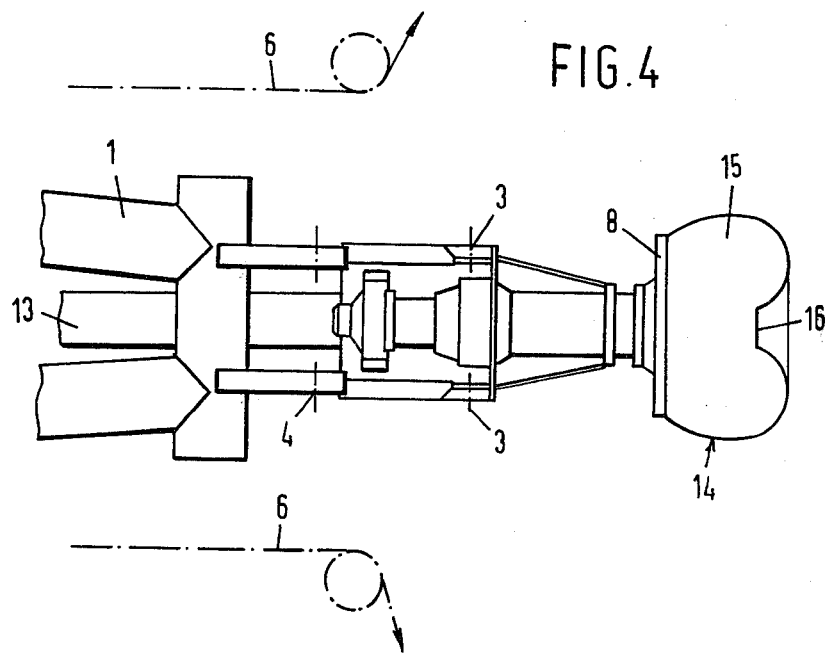

GEAR CASE FOR A SUCTION CUTTER DREDGER

This invention relates to a gear case for driving tools to be used under water.

In underwater earth moving technology, various kinds of cutting tools are used, including rotary cutter heads. Among these are the crown head and the disc head. A crown head is a rotary cutting tool having a drive shaft, a head plate with a connection for a suction pipe, and an array of approximately J-shaped, flat or curved blades, secured to the peripheral zone of the head plate and meeting at a central point spaced from the head plate. A disc head is distinguished from a crown head in the presence of a bottom plate in spaced juxtaposition to the head plate. The blades may be secured to the bottom plate and/or arranged circumferentially between the head plate and the bottom plate.

A known technique for driving such cutter heads under water is that in which the drive mechanism is housed in a gear case. The output shaft of the drive mechanism, for example a hydromotor, extends from the case and carries the cutter head. The case is secured to the lower end of the so-called ladder frame, the upper end of which is mounted on a vessel, for example, a suction cutter dredger, so as to be capable of pivoting movement in the vertical plane, so that the ladder frame can bring the tool under water to the front to be excavated.

Soil loosened by the tool is discharged in a mixture with water, as a slurry, through a suction pipe guided along the ladder frame. The operative positions of the crown head and the disc head are different. The crown head is pressed by the ladder axially against the front, whereas the disc head is held with its bottom in approximately horizontal position and pushed with its blades radially against the slope front. In both cases, cuts are made by swinging the vessel with the ladder back and forth. The clearly different orientation of the drive shafts of a crown head and of a disc head in the respective operative positions has hitherto rendered it necessary to use different gear cases adapted to the respective operative positions, and to mount a different gear box for switching from one cutter head to the other.

It is an object of the present invention to avoid this drawback and to provide a gear box which can be optimally adapted to the operative position of both a crown-type cutter head and a disc-type cutter head i.e., which is universally suitable for use with heads operating with a substantially horizontal drive shaft and those operating with a vertical drive shaft, and which additionally is capable of pivotal movement relative to the ladder, which is especially necessary with disc-type heads.

For this purpose a gear box for a rotary cutter head of a suction cutter dredger is provided, according to the invention, with at least two connecting members each suitable for pivotally coupling the case to the ladder, which connecting members are located at the acute angles of an imaginary right-angled triangle, and the drive shaft extends approximately along or approximately parallel to, one of the legs of said triangle.

Assuming that the case is secured to the ladder so that the drive shaft is oriented approximately horizontally then when the ladder is connected to the other connecting member the orientation of the drive shaft will be changed through 90° and consequently the same gear case can be used for both crown heads and disc heads.

Some embodiments of the invention will now be described, by way of example, with reference to the accompanying drawings, in which FIG. 1 is a diagrammatic side-elevational view of a gear box according to the invention in the position adapted to the operation of a disc head;

FIG. 3 shows the position of the gear case in the combination with a crown head in side-elevational view;

FIG. 4 is a plan view of the combination shown in FIG. 3; and

Figure 1:
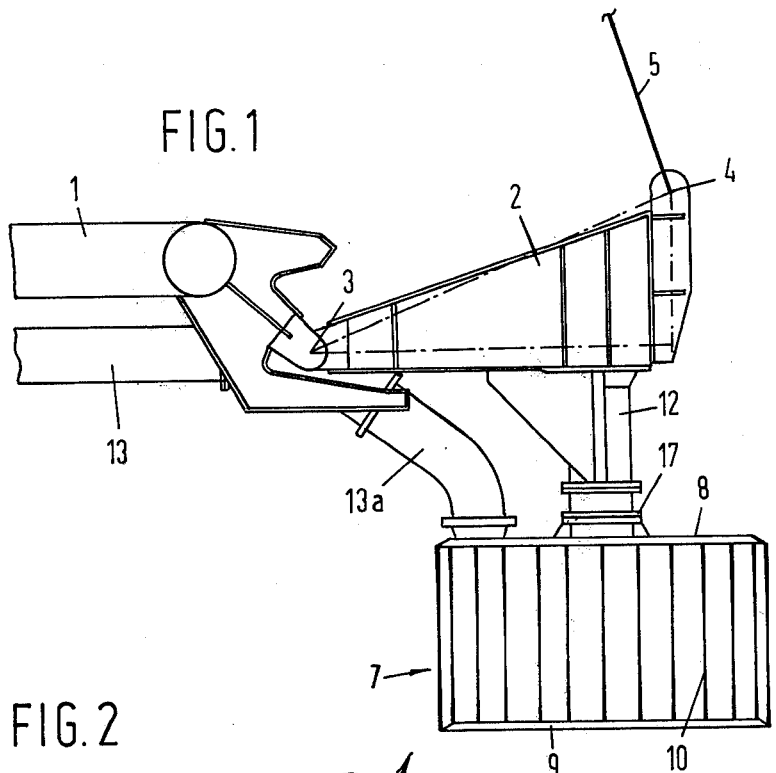

Referring to the drawings, there is shown a ladder 1, connected to a dredging vessel (not shown) so as to be capable of being pivoted upwardly and downwardly. Connected to the lower end of the ladder, also for up-and-down pivoting movement is a gear case 2 by means of a pivot connection designated in FIG. 1 by numeral 3 and in FIG. 3 by numeral 4. In the embodiment of FIGS. 1-4, case 2 is pivoted up and down relative to ladder 1 by means of a hoisting cable 5 which in the situation of FIG. 1 acts on connecting point 4 and in FIG. 3 on connecting point 3. The swinging across the face of the cutter heads is effected by means of winches (not shown) and cables 6.

Figure 2:
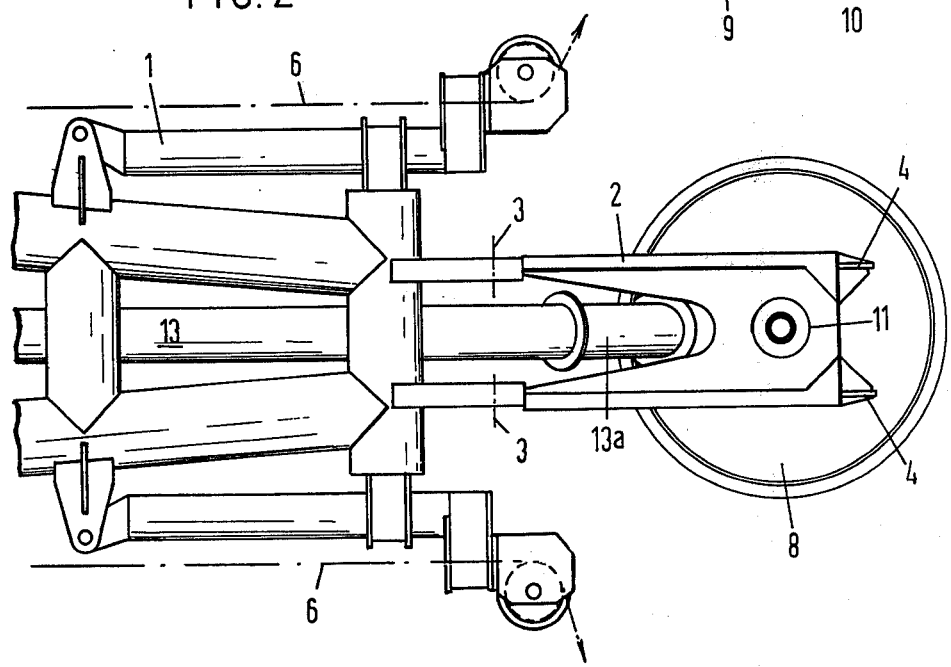
FIG. 2 is a plan view of the combination of gear case and disc head of FIG. 1.

FIGS. 1 and 2 show the gear case in combination with a cutter head 7 of disc-shaped configuration, having a top plate 8, a bottom plate 9 and a ring of blades 10 extending substantially between the circumferential zones of plates 8 and 9. Head 7 is rotated by the driving gear 11 in case 2 via a shaft 12, and the inner space of the ring of blades 10 communicates via a suction pipe 13 with a pump. The lower end 13a of suction pipe 13 is flexible to enable it to follow pivotal movements of case 2 and head 7. Cutter head 7 will not be described in detail herein. The only point of importance is that it is a head whose normal operative position does not differ much from the position shown in FIG. 1 with drive shaft 12 extending substantially vertically.

In FIGS. 3 and 4, corresponding parts are designated by the same reference numerals as in FIGS. 1 and 2. The situation depicted in FIGS. 3 and 4 is different from that shown in FIGS. 1 and 2 in two points only, i.e., instead of a disc-type head 7, a head 14 with the configuration of a crown is mounted on shaft 11, and gear case 2 is connected to ladder 1 in a different position.

A crown head has in principle no bottom plate, and a ring of blades extends from the circumferential zone of the top plate 8 to meet at a central position 16 located in spaced relationship to the top plate. Again, the specific construction of head 14 is not essential. The essential point is that, in the normal operative position, the drive shaft of this head extends at least substantially from the lower end of ladder 1 forwardly and co-extensive therewith. In this situation the feed-in force is transmitted from ladder 1 to shaft 12 via an abutment 2a.

As best shown in FIGS. 1 and 3, switching from the combination of gear case 2 with disc head 7 to the combination of gear case 2 with crown head 14 only requires (FIG. 1) detaching suction pipe section 13, the ladder connection at 3, the hoisting cable connection at 4, and the flange connection 17 with head 7, turning gear case 2 so that it can be connected at connection point 4 with the ladder and at connection point 3 with the hoisting cable, and the other head 14 can be coupled with the flange connection to the drive shaft.

FIGS. 1 and 3 show a right-angled traingle. The acute angles thereof are at the connection points 3 and 4. In these Figures, the drive shaft 12 is shown to be oriented parallel to one of the legs of the triangle, from which it follows that a change between the situation shown in FIGS. 1 and 3 involves a change in orientation of drive shaft 12 through 90°. In case, in practice, there is a need for different changes in angular position, this can be taken into account in designing the gear case. A change from the situation shown in FIG. 1 to that of FIG. 3 at any rate makes it necessary for the connections 3 and 4 to ladder 1 and to hoisting cable 5 to be interchangeable in a simple manner.

Figure 5:
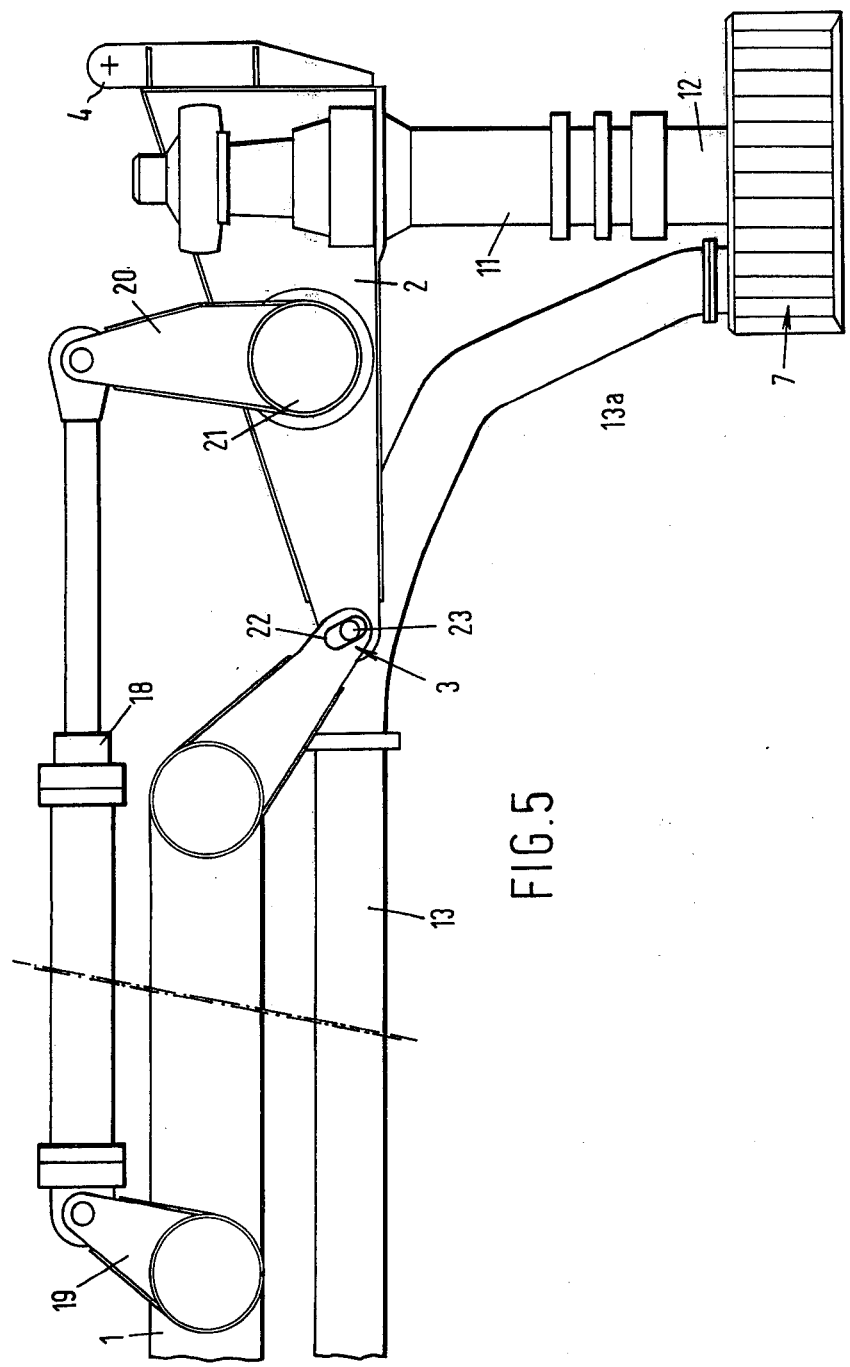
FIG. 5 is a side-elevational view of a variant embodiment of the gear case according to the invention.

FIG. 5 shows a variant embodiment of the gear case 2, shown in combination with a disc-type cutter head 7. Just as in the embodiment of FIGS. 1-4, case 2 has pivotal connections 3 and 4, each suitable for pivotally coupling case 2 to ladder 1. The pivotal movement of case 2 relative to the ladder is not, however, effectd by means of a hoisting cable 5 but by means of a hydraulic jack 18, which is connected to ladder 1 by a fixed arm 19 and to the case by an arm 20, which can be fixed in different positions relative to gear case 2 by means of a ring clamp 21. In the combination with a disc-type cutter head 7, as shown in FIG. 5, pivot point 4 has no function. When the case is converted for combination with a crown-type cutter head then, similarly to the embodiment of FIGS. 1-4, the case is coupled to ladder 1 by means of pivot point 4, and pivot point 3 has no function. Arm 20 is detached relative to case 2 and after being pivoted fixed so that it is again oriented approximately at right angles to jack 18.

In both embodiments, the connection point 3 may take the form of a slotted hole 22 through which a cross-pin 23 of the ladder extends with clearance, so that case 2 can be tilted laterally relatively to the median plane of the ladder, thereby to produce a clearance angle for disc head 7. In fact it has turned out to be favourable for a disc head to tilt slightly in the direction of swing of the ladder. The tilting movement can be effected, for example, by means of hoisting cable 5 which in the embodiment of FIGS. 1 and 2 is present anyway and in that shown in FIG. 5 may be especially connected to connection point 4 for this purpose.

What I claim is:

1. A gear case for a rotary cutter head, said case connected to a ladder extending from a suction cutter dredger, said case comprising a configuration having at least two ends, said configuration having connecting members positioned at the ends thereof each of said members adapted to pivotally connect said gear case to said ladder, a drive shaft attached to and extending from, said gear case, said shaft having a rotary cutter head attached to the end thereof.

2. A gear case as claimed in claim 1, wherein each of the connecting members (3,4) is suitable for coupling a hoisting cable (5) thereto.

3. A gear case as claimed in claim 1, wherein the connecting member (3) comprises a slotted hole (22), through which a cross-pin (23) extends with clearance.

4. A gear case as claimed in claim 1, said connecting member (3) pivotally attaching said gear case to said ladder and said drive shaft extending in perpendicular relationship to said ladder.

5. A gear case as claimed in claim 4, said connecting member (3) said ladder (1) being connected thereto so as to permit lateral tilting movement of said case (2) relative to the median plane of the ladder (1).

6. A gear case as claimed in claim 1, said connecting member (4) pivotally attaching said gear case to said ladder and said drive shaft extending in parallel relationship to said ladder.

7. A gear case as claimed in claim 1 or 4 or 6, comprising an arm (20) which can be affixed to the case (2) in a plurality of positions, and which is operatively associated with a jack (18) connected to the ladder (1).

8. A gear case as defined in claim 1, said configuration comprising a generally triangular shape.

* * * * *